Nov. 4, 1952 L. V. GUILD 2,616,628
TEMPERATURE CONTROLLED GAS ANALYSIS APPARATUS
Filed June 22, 1948 3 Sheets-Sheet 1

INVENTOR.
Lloyd V. Guild
BY William B. Jaspert
Attorney.

Nov. 4, 1952          L. V. GUILD          2,616,628
TEMPERATURE CONTROLLED GAS ANALYSIS APPARATUS
Filed June 22, 1948          3 Sheets-Sheet 2
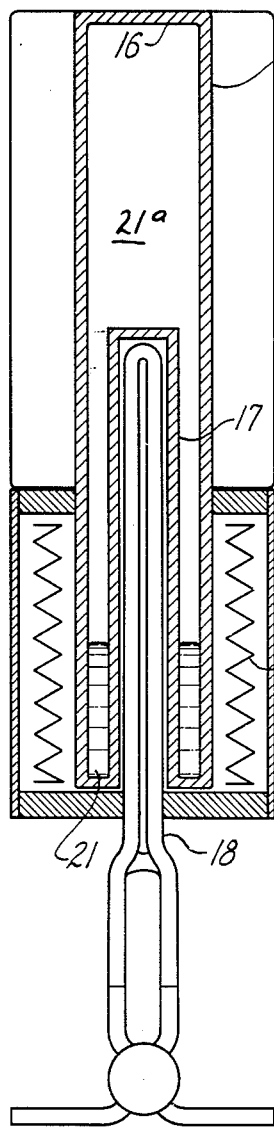
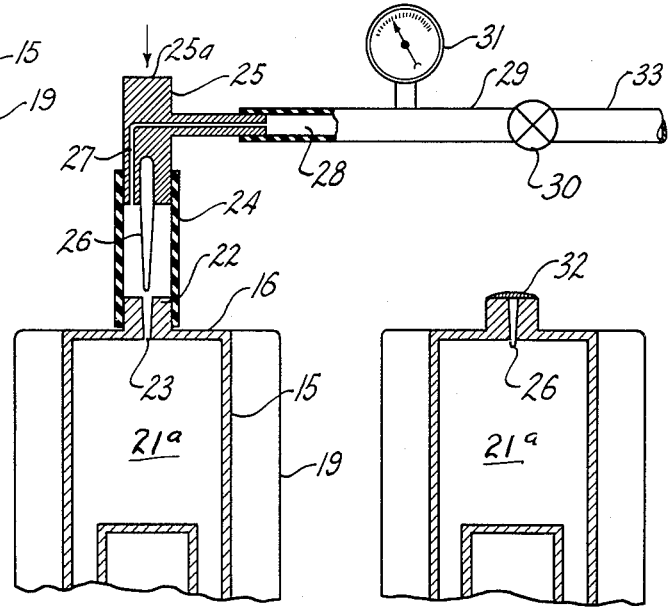
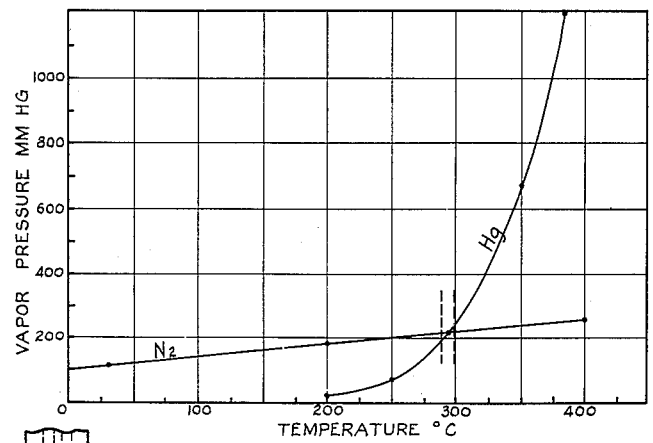
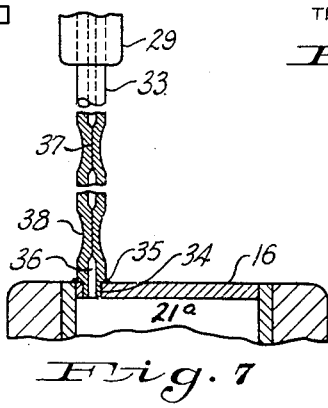
INVENTOR.
Lloyd V. Guild
BY William B. Jaspert
Attorney.

INVENTOR.
Lloyd V. Guild
BY William B. Jaspert

Patented Nov. 4, 1952

2,616,628

UNITED STATES PATENT OFFICE 2,616,628

TEMPERATURE CONTROLLED GAS
ANALYSIS APPARATUS

Lloyd V. Guild, Pittsburgh, Pa.

Application June 22, 1948, Serial No. 34,522

9 Claims. (Cl. 236—1)

This invention relates to heaters for maintaining constant absolute temperatures useful where proper heat control is essential as, for example, in the analysis of combustible gases by catalytic oxidation or selective oxidation by copper oxide, as disclosed in my copending application Serial No. 593,140, filed May 11, 1945.

In making the analysis in accordance with the method disclosed in my copending application, it is necessary to maintain the temperature within close limits to prevent an error due to gas volume variations caused by changes in temperature of the gas within the reaction tubes. Also the proper range of temperature must be maintained for both catalytic and copper oxide oxidation. The temperature must be maintained in the proper range when using copper oxide to bring about a rapid oxidation of hydrogen and carbon monoxide while preventing the oxidation of hydrocarbon gases which occurs if the temperature rises above certain limits. A proper operating temperature is also essential to obtain rapid and complete oxidation of hydrocarbons by catalytic oxidation.

Because of the relatively high temperatures employed, thermometers and mechanical thermostats are not dependable and, of course, require frequent calibration. Manual controls can be used but are time consuming and fluctuate with voltage variations.

I have found that a heater of sturdy construction utilizing the vapor pressure and heat of vaporization of liquids to maintain absolute temperature control can be designed for many uses and of a form to conveniently adapt it for use for heating copper oxide, catalyst or other tubes of U-tube or other shapes.

The invention will become more apparent from a consideration of the accompanying drawings, constituting a part hereof, in which like reference characters designate like parts, and in which—

Fig. 1 is a top plan view of a heater embodying the principles of this invention;

Fig. 2 a side elevational view thereof, partially in cross section;

Fig. 3 a view in side elevation, partially in section, diagrammatically illustrating the adaptation of the heater to the heating of a straight catalyst tube;

Fig. 4 a similar view illustrating the adaptation of the heater for the heating of a U-tube;

Fig. 5 a vertical section, partially in elevation, of the top of a heater with the bottom cut away, and apparatus for sealing the vapor chamber of the heater;

Fig. 6 a vertical cross-sectional view of the top portion of the heater after it is sealed;

Fig. 7 is a vertical cross sectional view, partially broken away, of the top of a heater illustrating a different form of sealing means than shown in Fig. 5 of the drawings;

Fig. 8 and Fig. 9 are charts illustrating the effect of temperature on the vapor pressure of a liquid and the effect of the temperature on the pressure of a gas.

It is a well known fact that one unalterable property of pure liquids is the constancy of the vapor pressure at a given temperature. The exact vapor pressure varies with different liquids, but for any one liquid it is a fundamental specific property of that liquid at any given temperature. The curve of Fig. 8 designated Hg shows the vapor pressure of the liquid mercury at different temperatures, in which the vapor pressure as the ordinate is plotted against the temperature as the abscissa. A liquid begins to boil when the vapor pressure equals the pressure of the prevailing atmosphere above the liquid; thus the boiling point of a liquid can be varied by varying the pressure above the liquid. It is also a well known fact that heat is required to change a substance from a liquid phase to a gas phase and contrariwise heat is liberated when a substance changes from a gas phase to a liquid phase. For any one liquid the heat of evaporation equals the heat of condensation.

Figure 3:
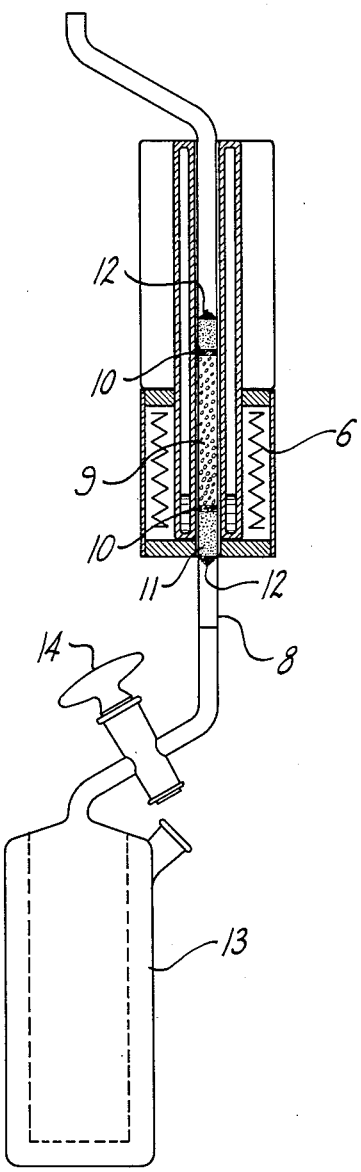

These principles are utilized in the heaters as shown in the drawings, in which the numeral 1 designates a double walled tube forming a closed chamber 2 which contains a limited quantity of liquid 3, such as mercury. The tube is provided with radial fins 4 to effect loss of heat to prevent total vaporization of the liquid. The bottom of the heater is of cylindrical form as shown in elevation at 5 for receiving an electrical or other heating element, such as the electrical element 6 shown diagrammatically in Fig. 3 of the drawings. The double walled tube 1 is provided with an inner cylindrical chamber 7 extending entirely through the heater for receiving a catalyst tube, such as the tube 8, Fig. 3, which is maintained at absolute constant temperature regardless of variations in the heat output of the heating element 6, as will be hereinafter explained.

The tube 8 contains a catalyst 9, which is segregated by glass wool 10 beyond which it is charged with a ceramic powder 11 and capped off with glass wool 12 at both ends. The bottom of the tube may be connected to a vessel 13 containing a gas sample to be analyzed, which is controlled by the stopcock 14, and the top of the tube 8a may be connected to means for measuring the volume of gases being analyzed.

Figure 1:
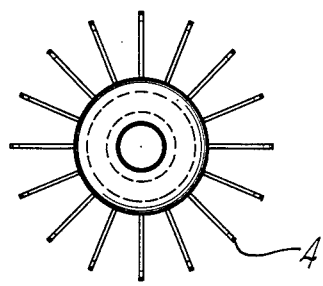

In the construction shown in Fig. 4, a steel tube 15 closed at the top at 16 and having a reentrant wall 17 is designed to receive a U-tube 18 containing a catalyst or other ingredients to be heated. The heating tube 15 is provided with radial cooling fins 19 as shown in Fig. 1, a heater 20, and contains mercury 21 or other liquid suitable for carrying out the principles of this invention.

Figure 9:
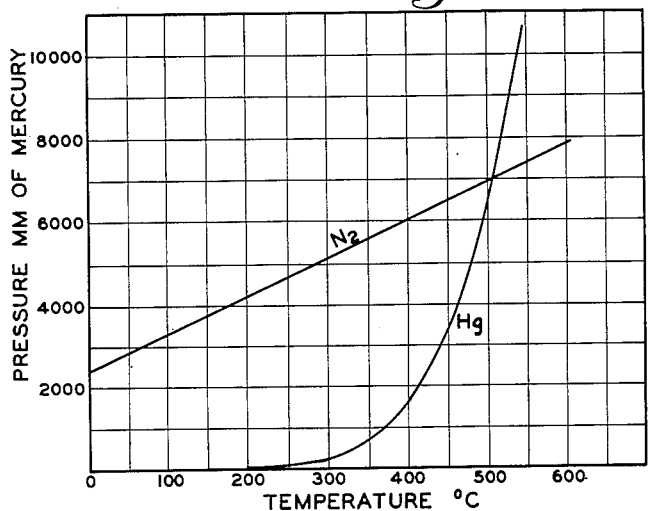

In actual operation, gas pressure is established as hereinafter described, above liquids 3 and 21 in chambers 2 and 21a, such that at the required temperature, the gas pressure equals the vapor pressure. For example, if mercury is the liquid used, in a heater as per Fig. 4, and the required temperature is 510° C., the pressure would be sealed in at 2600 mm. pressure (absolute) at room temperature. When the heater element 20 is energized, the gas pressure in chamber 21a increases as shown by the curve designated $N_2$ of Fig. 9 and the vapor pressure of the liquid 21 (mercury in this example) increases as designated by the curve Hg in Fig. 9. When the temperature reaches 510° C. the vapor pressure of liquid 21 equals the pressure of the inert gas atmosphere in chamber 21a, causing the liquid to begin to boil. The temperature becomes constant and any excess heat is absorbed in vaporizing the liquid. Thus the heat of vaporization of the liquid is utilized in carrying away the excess heat. The vaporized liquid or gas passes upward to the cold zone above the reaction zone having heat radiating fins 19. In this zone, the liquid condenses, discharging the excess heat through fins 19, and returns to the original heating zone by gravity. As long as there is any unvaporized liquid the temperature of the liquid and vapor remains constant. Thus no attempt is made to control the heat input within close limits, the heater inherently being capable of discharging all heat above that required for the specific temperatures. The temperature may be varied when using the same liquid by changing the pressure in chamber 21a. Thus, a heater controlling at 290° C. would be sealed in at approximately 100 mm. pressure as shown in Fig. 8.

Figure 11:
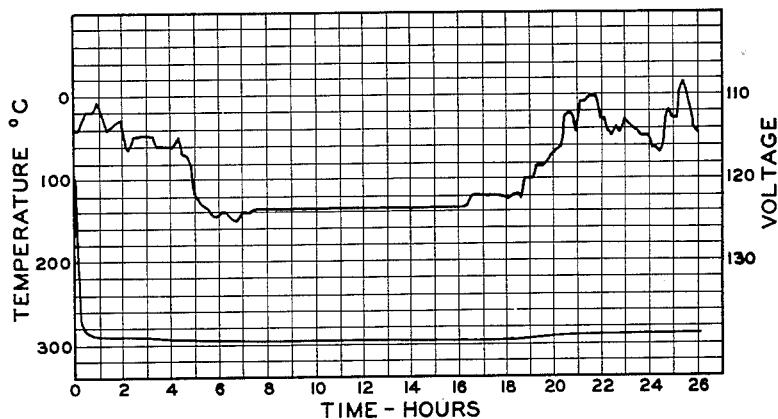
Fig. 10 and Fig. 11 are charts showing the operating characteristics of one of these heaters.
Figure 10:
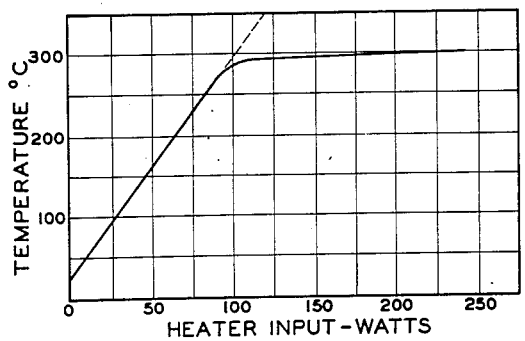

The way in which this heater maintains a constant temperature with a variable heat input is shown in Fig. 10 and Fig. 11. The curve of Fig. 10 shows the temperature as ordinate plotted against power input in watts as abscissa. Fig. 11 shows an actual record of the temperature of the heater as recorded by a standard temperature and voltage recorded in which the voltage applied to the heater and the temperature of the heater as abcissa are plotted against time as the ordinate. The upper curve is the voltage and the lower curve the temperature.

Figure 2:
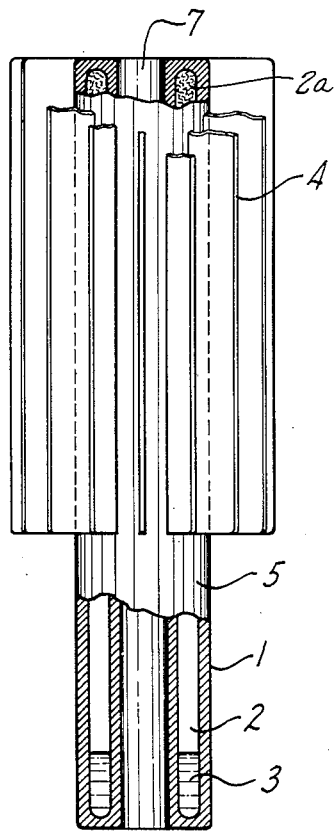

To allow free escape of vapor formed from the liquid 21, Fig. 4, or the liquid 3, Fig. 2, without violence or bumping, a small amount of glass or steel wool may be placed within the liquid and in the upper region of the chamber as shown at 2a in Fig. 2. Instead of mercury as given in the illustration various liquids or solids can be used to control the heater at any desired temperature; thus mercury could be used to control the temperature between 200° C. and 550° C.; selenium may be employed to control temperatures between 550° C. to 800° C.; cadmium from 600° C. to 900° C.; antimony from 900° C. to 1300° C., etc. Liquids with different boiling points can be developed by mixing two compounds together (miscible) that boil above and below the required temperature. The elevation of boiling point of the lowest boiling compound will be approximately equal to the difference in boiling points multiplied by the mole fraction of the material with the highest boiling point.

If it is desired to lower the boiling point of a compound in the heater without changing the pressure, an immiscible liquid is introduced. In such a mixture the boiling point is reached when the sum of the two partial pressures equals that of the prevailing atmosphere. These two compounds then boil together.

If it is desired to elevate the boiling point of a liquid by adjusting the pressure above the liquid, then another liquid with a lower boiling point can be introduced in the proper quantity such that it will completely vaporize and build up a pressure equal to the vapor pressure of the liquid at the required temperature. Thus 0.227 ml. of water was used to control an experimental heater to elevate the boiling point of mercury to 510° C.

Or any heater can be regulated to maintain a constant temperature by evacuating and filling the vapor chamber with a gas to the proper pressure. This may be accomplished as shown in Fig. 5 as follows. The top wall 16 of the tube 15 may be provided with a boss 22 having a passage 23, the boss being of cylindrical form for receiving a piece of rubber tubing 24 which is connected to a T-fitting 25 capable of holding a tapered sealing pin 26 and having a gland 27 for connection with the passage 28 of a hose 29, the latter being provided with a valve 30 and a gage 31. Inlet 33 is connected to a source of gas under pressure. The gas vapor chamber 21a is then filled to the desired pressure through valve 30 as indicated by the pressure gage 31. When the pressure has reached a desired value, the T-fitting 25 is struck on the head 25a in the direction indicated by the arrow to drive the sealing pin 26 into the tapered passage 23 in the sealing position shown in Fig. 6. The pin 26 is then cut off and the top of the boss 22 may be welded as shown at 32 to permanently seal the chamber of the tube 15.

Another and perhaps more effective method of sealing gas in the chamber 21a under pressure is illustrated in Fig. 7 and employs a fine bore tubing 33 which is fitted into a drill hole 34 of the wall 16 and sealed by welding as shown at 35. The top of the tube is connected to a hose 29 or other conduit having a gage and valve as shown in Fig. 5. The tube 33 is provided with a fine bore 36 and sealing is effected by impinging a flame, as from a welding torch, first at a distance spaced above the wall 16, and when the heated portion of the tube is from red to white hot, it is squeezed, as shown at 37, to seal off the fine bore. The tube 33 is then heated directly adjacent the wall 16 of the heater and again pinched, as shown at 38, thus forming a double seal. The tube is then cut off and forged into a neat point.

It is evident from the foregoing description of this invention that by utilizing the principle of the constancy of vapor pressures at given temperatures a heater may be controlled to maintain an absolute constant heat output independently of the variations in the medium for supplying heat energy to the unit.

Although several embodiments of the invention have been herein illustrated and described, it will be evident to those skilled in the art that various modifications may be made in the details of construction without departing from the principles herein set forth.

I claim:

1. A heater for maintaining constant temperatures comprising a sealed double wall heating chamber the inner wall forming a heating surface of substantially the shape of a container for an element to be heated, the space in the double wall heating chamber being partially filled with a liquid of constant volume and being sealed in under gas pressure to maintain a pressure atmosphere, heating means surrounding a portion of said sealed chamber for heating the liquid in said chamber, and cooling means for another portion of said sealed chamber for condensing the vapor to maintain a constant pressure thereby maintaining a constant temperature in the space for the element to be heated.

2. A heating furnace for maintaining constant temperature in the heating chamber comprising a sealed double wall closed chamber the inner wall forming a heating space of substantially the shape of a container for an element to be heated, said double wall chamber having a heating zone at one end for exposure to a source of heat and having a cooling zone at the other, said chamber being sealed in under gas pressure to maintain a constant vapor pressure independently of the heat input to said chamber for any given vapor in said chamber, said vapor being generated from a fluid permanently contained therein, the temperature to be maintained in the heating chamber of said double wall chamber being determined by the pressure existing in the chamber at the time of sealing said chamber.

3. A heater as set forth in claim 1 containing mercury as the liquid and sealed in under gas pressure at 10 to 5000 mm. to control at 200° C. to 600° C.

4. A heater as set forth in claim 1 containing mercury as the liquid and sealed in under gas pressure at 90 mm. to control at 290° C.

5. A heater as set forth in claim 1 containing mercury as the liquid and sealed in under gas pressure at 2600 mm. to control at 510° C.

6. A heating furnace for maintaining constant temperature in the heating chamber comprising a sealed double walled closed chamber, the inner wall forming a heating space of substantially the shape of a container for an element to be heated, said double walled chamber having a heating zone at one end for exposure to a source of heat and having a cooling zone at the other end thereof, said chamber being sealed in under gas pressure to maintain a constant vapor pressure independently of the heat input to said chamber, a liquid partially filling the space in the double wall heating chamber, and a high temperature resistant fibrous material filling the remaining portion of the heating chamber to allow free escape of vapor from the liquid without violence or bumping.

7. In a heating furnace for maintaining constant temperature in the heating chamber, a sealed in double walled chamber, the inner wall forming a heating space of substantially the shape of a container for an element to be heated, said double walled chamber having a heating zone at one end for exposure to a source of heat and having a cooling zone at the other end thereof, said chamber being sealed in under gas pressure, a liquid in said chamber for maintaining temperature control by utilizing the heat of vaporization of said liquid, and a second liquid in said chamber of a predetermined quantity and of a lower volatilization temperature than that of said first-named liquid to establish a predetermined pressure acting on the vapor of said first-named liquid when the second-named liquid is completely volatilized.

8. In a heating furnace for maintaining constant temperature in the heating chamber, a sealed in double walled chamber, the inner wall forming a heating space of substantially the shape of a container for an element to be heated, said double walled chamber having a heating zone at one end for exposure to a source of heat and having a cooling zone at the other end thereof, said chamber being sealed in under gas pressure, a liquid in said chamber for maintaining temperature control by utilizing the heat of vaporization of said liquid, said liquid comprising two miscible liquids mixed in the proportion to give the desired temperature.

9. In a heating furnace for maintaining constant temperature in the heating chamber, a sealed in double walled chamber, the inner wall forming a heating space of substantially the shape of a container for an element to be heated, said double walled chamber having a heating zone at one end for exposure to a source of heat and having a cooling zone at the other end thereof, said chamber being sealed in under gas pressure, a liquid in said chamber for maintaining temperature control by utilizing the heat of vaporization of said liquid, said liquid comprising two immiscible liquids mixed in the proportion to give the desired temperature.

LLOYD V. GUILD.

REFERENCES CITED

The following references are of record in the file of this patent:

UNITED STATES PATENTS

| Number | Name | Date |
|---|---|---|
| 854,278 | Darlington | May 21, 1907 |
| 1,494,134 | Ritterath | May 13, 1924 |
| 1,541,930 | Eggleston | June 16, 1925 |
| 1,629,174 | Patton | May 17, 1927 |
| 1,748,518 | Midgley | Feb. 25, 1930 |
| 1,753,676 | Whitney | Apr. 8, 1930 |
| 1,801,210 | Schlaich | Apr. 14, 1931 |
| 1,848,319 | Clifford | Mar. 8, 1932 |
| 2,026,423 | Fiene | Dec. 31, 1935 |
| 2,028,261 | Vernet | Jan. 21, 1936 |
| 2,156,053 | Fiene | Apr. 25, 1939 |
| 2,362,342 | Baker | Nov. 7, 1944 |